(12) United States Patent
Egawa

(10) Patent No.: US 7,320,773 B2
(45) Date of Patent: *Jan. 22, 2008

(54) BIODEGRADABLE LAMINATE SHEET AND MOLDED ITEM FROM BIODEGRADABLE LAMINATE SHEET

(75) Inventor: Yosuke Egawa, Nagahama (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/520,744

(22) PCT Filed: Jul. 10, 2003

(86) PCT No.: PCT/JP03/08821

§ 371 (c)(1),
(2), (4) Date: Aug. 17, 2005

(87) PCT Pub. No.: WO2004/007197

PCT Pub. Date: Jan. 22, 2004

(65) Prior Publication Data

US 2006/0040119 A1  Feb. 23, 2006

(30) Foreign Application Priority Data

Jul. 11, 2002 (JP) ............................. 2002-202710
Oct. 18, 2002 (JP) ............................. 2002-304281

(51) Int. Cl.
B32B 37/14 (2006.01)
B32B 37/15 (2006.01)
B32B 37/16 (2006.01)
B32B 38/00 (2006.01)
B32B 7/00 (2006.01)

(52) U.S. Cl. ................. 264/331.11; 428/212; 428/480; 264/173.11; 264/173.12; 264/173.15; 264/173.16; 264/210.1; 264/241; 264/280; 264/285; 264/288.4; 264/291; 264/299; 264/319; 264/330; 264/331.21; 156/244.11; 156/244.24

(58) Field of Classification Search ................. None
See application file for complete search history.

(56) References Cited

U.S. PATENT DOCUMENTS 5,391,423 A * 2/1995 Wnuk et al. ................. 428/217
5,403,897 A * 4/1995 Ebato et al. ................. 525/444
5,661,193 A * 8/1997 Khemani ..................... 521/182
5,798,436 A * 8/1998 Gruber et al. ............... 528/354
5,849,374 A * 12/1998 Gruber et al. .............. 428/34.3
5,849,401 A * 12/1998 El-Afandi et al. ........... 428/215
5,939,467 A * 8/1999 Wnuk et al. ................ 523/128
6,005,068 A * 12/1999 Gruber et al. ............... 528/354
6,143,863 A * 11/2000 Gruber et al. ............... 528/354
6,207,792 B1 * 3/2001 Gruber et al. ............... 528/354
6,290,896 B1 * 9/2001 Suzuki et al. ................ 264/544
6,312,823 B1 * 11/2001 El-Afandi et al. ........... 428/480
6,372,331 B1 * 4/2002 Terada et al. ................ 428/212
6,417,294 B1 * 7/2002 Obuchi et al. ............... 525/450
6,573,340 B1 * 6/2003 Khemani et al. ............ 525/437
2002/0094444 A1 * 7/2002 Nakata et al. ............... 428/480
2005/0244606 A1 * 11/2005 Egawa ......................... 428/98
2006/0286373 A1 * 12/2006 Egawa ........................ 428/339

FOREIGN PATENT DOCUMENTS

| EP | 0 514 137 | 3/1998 |
|---|---|---|
| EP | 0 909 640 | 4/1999 |
| EP | 1 008 629 | 6/2000 |
| JP | 7-308961 | 11/1995 |
| JP | 8-73628 | 3/1996 |
| JP | 08-073628 | * 3/1996 |
| JP | 08-085194 | * 4/1996 |
| JP | 8-85194 | 4/1996 |
| JP | 08-323946 | * 12/1996 |
| JP | 8-323946 | 12/1996 |
| JP | 10-6445 | 1/1998 |
| JP | 10-100353 | * 4/1998 |
| JP | 2002-248677 | * 9/2002 |

OTHER PUBLICATIONS

Schimtz, Peter et al., "Films." Ullmann's Encyclopedia of Industrial Chemistry, 5th Ed., vol. A11 (1988), pp. 85-95, 108-110.*
Whelan, Tony, Polymer Technology Dictionary (1994), p. 164.*

* cited by examiner

*Primary Examiner*—Vivian Chen
(74) *Attorney, Agent, or Firm*—Wenderoth, Lind & Ponack, L.L.P.

(57) ABSTRACT

A biodegradable laminate sheet having as its object to provide a formed body superior in heat resistance, shock resistance, transparency and formability, and having non-stretched polylactic acid-family resin layer of which the crystallinity is 20% or less, and a layer comprising a biodegradable resin other than a polylactic acid-family resin.

6 Claims, No Drawings

BIODEGRADABLE LAMINATE SHEET AND MOLDED ITEM FROM BIODEGRADABLE LAMINATE SHEET

TECHNICAL FIELD

The present invention relates to a biodegradable laminate sheet of a polylactic acid-family resin which can be formed by various formings such as vacuum forming, air-pressure forming, vacuum air-pressure forming and press forming, a method of forming such a laminate sheet, and a formed body obtained from such a laminate sheet. More specifically, it relates to a biodegradable laminate sheet of a polylactic acid-family resin which is superior in heat resistance, shock resistance and formability, and which decomposes under a natural environment, a method of forming such a laminate sheet, and a formed body obtained from such a laminate sheet such as a food container such as a cup or a tray, a blister packaging material, a hot-fill container, a plastic case, or a tray or a carrier tape for transporting electronic parts.

BACKGROUND ART

As a material for a food container such as a cup or a tray, a blister pack, a container for hot-fill, a plastic case, or a tray or a carrier tape for transporting electronic parts, polyethylene, polypropylene, polyvinyl chloride, polystyrene, polyethylene terephthalate, or the like have been used. These plastic products or the like are generally discarded after use, so that disposal such as burning and burial when discarding after use poses a problem. Resins such as polyethylene, polypropylene and polystyrene are large in calorific value when burnt, so that they may damage incinerators during burning treatment, and polyvinyl chloride produces harmful gas during burning.

On the other hand, for burial disposal, too, since these plastic products are high in chemical stability, they will barely decompose in the natural environment and remain semipermanently in the earth, so that they will saturate the capacity of garbage disposal sites in a short time. Also, if discarded in the natural environment, they will mar the landscape or destroy the life environment of marine lives or the like.

Therefore, from the viewpoint of environmental protection, in recent years, studies and developments of biodegradable materials are being actively done. As one of biodegradable materials that are gathering attention, there is a polylactic acid. Since a polylactic acid-family resin is biodegradable, hydrolysis proceeds naturally in the earth and water, so that it becomes a harmless decomposed product. Also, since it is small in burning calorie, even if it is subjected to burning treatment, it will not damage furnaces.

Further, since the starting material originates from a plant, it does not-resort to oil resources which is exhausting.

But a polylactic acid-family resin is low in heat resistance, and was not suitable for use at high temperature such as containers for heated foods or containers into which hot water is to be poured. Also, in storing or transporting polylactic acid-family resin sheets or their formed bodies, the interiors of storages, transporting trucks and ships often reach high temperature in summer, so that problems of deformation, fusing, etc. occur.

As a technique for imparting heat resistance to a polylactic acid-family resin, there is a method in which in a forming step, the heat resistance is imparted by crystallizing a polylatic acid to a high degree in a mold by holding the mold near the crystallizing temperature of the polylactic acid-family resin (80-130° C.). But in this method, in order to crystallize the formed polylactic acid in the mold, until crystallization is completed, the formed body has to be held in the mold, so that the forming cycle becomes longer than during normal forming, and thus the manufacturing cost becomes high. Also, since it is necessary to heat the mold, a heating facility is also necessary.

Also, there is a method in which heat resistance is imparted by post-crystallizing a polylactic acid-family resin to a high degree by annealing it after forming. But in this method, in the process of post-crystallizing the formed body of a polylactic acid-family resin, the formed body may be deformed, so that problems arise in dimensional accuracy. Also, since a step for post-crystallizing is necessary, the manufacturing cost becomes high.

As another method of imparting heat resistance to a polylactic acid-family resin, there is known a method in which after making the storage elasticity in a predetermined range by pre-crystallizing a lactic acid-family polymer sheet by annealing, forming is carried out in a heated mold (see patent document 1). But in this method, too, in order to obtain a heat-resistant formed body, it is necessary to keep the temperature of the mold near the crystallizing temperature of the polylactic acid-family resin (80-130° C.), and finish crystallization of the polylactic acid-family resin in the mold, so that a facility for heating the mold is necessary. Also, in this method, the forming cycle becomes longer than during normal forming, so that the manufacturing cost becomes high.

Furhter, in the above-described method in which a polylactic acid-family resin is crystallized, the formed body obtained by the growth of spherutiles basically becomes opaque. Thus it is difficult to obtain a formed body having transparency.

On the other hand, as a technique regarding laminate sheets comprising a polylactic acid-family resin and a biodegradable aliphatic polyester other than a polylactic acid-family resin, there are known laminate films of aliphatic polyester having a number-average molecular weight of 10000 or over and polylactic acid-family resin (see patent document 2), and laminate films of polylactic acid-family resin and a biodegradable aliphatic polyester other than polylactic acid-family resin (see patent document 3).

(patent document 1) JP patent publication 8-73628
(patent document 2) JP patent publication 8-85194
(patent document 3) JP patent publication 10-6445

PROBLEM THAT THE INVENTION INTENDS TO SOLVE

But polylactic acid-family resin used as laminate films described in the patent documents 2 and 3 are stretched ones, and the technical object is to improve the heat-sealability of packaging bags.

Therefore, the present invention has as its object to provide a formed body which is superior in heat resistance, shock resistance, transparency and formability.

MEANS TO SOLVE THE OBJECT

As a result of conducting vigorous consideration to solve the above object, it has been found out that by laminating a polylactic acid-family resin and a biodegradable resin other than a polylactic acid-family resin, various formings such as vacuum forming, air-pressure forming, vacuum air-pressure forming and press forming are possible, and also a heat-resistant formed body is obtainable even without holding the mold near the crystallizing temperature of the polylactic acid-family resin (80-130° C.), and the present invention has been reached.

The invention concerning the biodegradable laminate sheet according to the present application relates to a sheet having a non-stretched polylactic acid-family resin of which the crystallinity is 20% or less and a biodegradable resin layer other than a polylactic acid-family resin.

Further, as the biodegradable resin layer other than a polylactic acid-family resin, a biodegradable aliphatic polyester layer other than a polylactic acid-family resin of which the glass transition temperature is 0° C. or less and which has the melting point of 80° C. or over may be used.

Also, it may be formed of at least three layers, with the biodegradable resin layers other than a polylactic acid-family resin forming outer layers, and the non-stretched polylactic acid-family resin layer being at least one layer sandwiched between the outer layers.

Further, it may be formed of at least three layers, with the non-stretched polylactic acid-family resin being outer layers, and the biodegradable resin layers other than a polylactic acid-family resin being at least one layer sandwiched between the outer layers.

Also, the non-stretched polylactic acid-family resin and the biodegradable resin layer other than a polylactic acid-family resin can be laminated by co-extrusion.

Further, the biodegradable laminate sheet described above may be formed at a temperature equal to or higher than the melting point of the biodegradable resin other than a polylactic acid-family resin.

BEST MODE FOR EMBODYING THE INVENTION

Below, embodiments of the present invention are described.

The biodegradable laminate sheet according to the present invention is a laminate sheet having a layer comprising a non-stretched polylactic acid-family resin of which the crystallinity is 20% or less, and a layer comprising a biodegradable resin other than a polylactic acid-family resin.

The polylactic acid-family resin used in the present invention comprises a polylactic acid-family polymer. The polylactic acid-family polymer includes a homo-polymer of which the structural unit is L-lactic acid or D-lactic acid, i.e. poly (L-lactic acid) or poly (D-lactic acid), a copolymer of which the structural unit is both of L-lactic acid and D-lactic acid, i.e. poly (DL-lactic acid), or their mixture. Further, it may be α-hydroxy carboxylic acid or a copolymer of diol/dicarboxylic acid.

As a polymerizing method for a polylactic acid-family polymer, any known methods such as condensation polymerization or ring-opening polymerization may be used. For example, in a condensation polymerization, it is possible to obtain a polylactic acid-family polymer having an arbitrary composition by directly dehydro-condensation-polymerizing L-lactic acid, D-lactic acid or their mixture.

Also, in a ring-opening polymerization, a polylactic acid-family polymer is obtainable by polymerizing a lactide, which is a cyclic dimer of lactic acid, while using a polymerization adjusting agent as necessary, using a selected catalyst. Among lactides, there are L-lactide, which is a dimer of L-lactic acid, D-lactide, which is a dimer of D-lactic acid, and DL-lactide, which comprises L-lactic acid and D-lactic acid. By polymerizing them while mixing as necessary, a polylactic acid-family polymer having an arbitrary composition and crystallinity is obtainable.

Further, for example, if it is necessary to improve heat resistance, as small-amount copolymerizing components, a non-aliphatic dicarboxylic acid such as terephthalic acid, or a non-aliphatic diols such as ethylene oxide addition products of bisphenol A may be used.

Still further, for the purpose of increasing the molecular weight, a small amount of a chain extender such as a diisocyanate compound, an epoxy compound or an acid anhydride may be used.

As the other hydroxyl-carboxylic acid units to be copolymerized with the polylactic acid-family polymer, an optical isomer of lactic acid (D-lactic acid for L-lactic acid, L-lactic acid for D-lactic acid), bifunctional aliphatic hydroxyl-carboxylic acids such as glycolic acid, 3-hydroxybutyric acid, 4-hydroxybutyric acid, 2-hydroxy-n-butyric acid, 2-hydroxy 3,3-dimethyl butyric acid, 2-hydroxy 3-methylbutyric acid, 2-methyllactic acid, and 2-hydroxycaproic acid, and lactones such as caprolactone, butyrolactone and valerolactone may be used.

As the aliphatic diol to be copolymerized with the polylactic acid-family polymer, ethylene glycol, 1,4-butane diol, 1,4-cyclohexane dimethanol or the like can be used. Also, as the aliphatic dicarboxylic acid, succinic acid, adipic acid, suberic acid, sebacic acid, dodecanoic diacid, or the like can be used.

But as for the composition ratio in the polylactic acid-family resin, the polylactic acid is the main body, and the molar % of lactic acid is 50 molar % or over.

The preferable range of the weight-average molecular weight of the polylactic acid-family polymer is from 50000 to 400000, preferably form 100000 to 250000. If it is below this range, practicality will scarcely reveal. If it exceeds, the melt viscosity would be too high, so that formability is inferior.

The biodegradable resin other than a polylactic acid-family resin is a constituent component for imparting heat resistance and shock resistance to the biodegradable laminate sheet and its formed body of the present invention.

As the biodegradable resin other than a polylactic acid-family resin, polyesteramide-family resin, cellulose-family resin, biodegradable aliphatic-family polyester other than a polylactic acid-family resin, polyvinyl alcohol, polyurethane, or the like can be used.

As the polyester amide-family resin, a copolymer of caprolactone and caprolactum can be used. Also, as the cellulose-family resin, cellulose acetate or the like can be cited.

As the biodegradable aliphatic-family polyester other than a polylactic acid-family resin, polyhydroxy carboxylic acid, aliphatic polyester or aliphatiec aromatic polyester obtained by condensing aliphatic diol and aliphatic dicarboxylic acid or aromatic dicarboxylic acid; aliphatic polyester copolymer obtained from aliphatic diol and aliphatic dicarboxylic acid and hydroxycarboxylic acid; aliphatic polyesters obtained by ring opening polymerizing cyclic lactones; synthetic aliphatic polyesters; and aliphatic polyesters bio-synthesized in fungus bodies may be used.

As the polyhydroxy carboxylic acid, a homopolymer or a copolymer of hydroxycarboxylic acids such as 3-hydroxybutyric acid, 4-hydroxybutyric acid, 2-hydroxy-n-butyric acid, 2-hydroxy-3,3-dimethylebutyric acid, 2-hydroxy-3-methylbutyric acid, 2-methyllactic acid or 2-hydroxycaproic acid may be used.

As the aliphatic diol, ethylene glycol, 1,4-butane diol, 1,4-cyclohexane dimethanol or the like may be used. Also, as the aliphatic dicarboxylic acid, succinic acid, adipic acid, suberic acid, sebacic acid, dodecanoic diacid, or the like may be used.

As the aromatic dicarboxylic acid, terephthalic acid, isophthalic acid or the like may be used.

The aliphatic polyester obtained by condensing these aliphatic diols and aliphatic dicarboxylic acids, and the aliphatic aromatic polyester obtained by condensing aliphatic diols, aliphatic dicarboxylic acids and aromatic dicarboxylic acids are obtained by selecting one or more kind from these compounds, and condensation polymerizing them. Further, as necessary, by jumping-up with an isocyanate compound, a desired polymer can be obtained.

As aliphatic diols and aliphatic carboxylic acids used for an aliphatic polyester copolymer obtained from aliphatic diols and aliphatic dicarboxylic acids and hydroxycarboxylic acids, ones mentioned above may be used. Also, as hydroxycarboxylic acids, L-lactic acid, D-lactic acid, DL-lactic acid, glycolic acid, 3-hydroxybutyric acid, 4-hydroxybutyric acid, 2-hydroxy-n-butyric acid, 2-hydroxy 3,3-dimetyl butyric acid, 2-hydroxy 3-methyl butyric acid, 2-methil lactic acid, 2-hydroxy caproic acid or the like may be used. For example, polybutylene succinate lactic acid, polybutylene succinate adipate lactic acid or the like may be used.

But as for the composition ratio in this case, aliphatic diol and aliphatic dicarboxylic acid are main bodies. For the molar %, aliphatic diol: 35-49.99 mole %, aliphatic dicarboxylic 35-49.99 mole %, and hydroxylcarboxylic acid: 0.02-30 mole %.

The aliphatic polyester obtained by ring opening polymerizing a cyclic lactone is obtained by polymerizing, as a cyclic monomer, one or more kind of $\epsilon$-caprolactone, $\delta$-valerolactone, $\beta$-methyl-$\delta$-valerolactone.

As the synthetic-family aliphatic polyester, a copolymer of a cyclic anhydride with an oxirane such as a copolymer of anhydrous succinic acid with ethylene oxide or propylene oxide may be used.

As the aliphatic polyester biosynthesized in the fungus, an aliphatic polyester biosynthesized by acetyl coenzyme A (acetyl CoA) in fungus represented by Alcaligenes eutrophus can be cited. The aliphatic polyester biosynthesized in the fungus is mainly poly-$\beta$-hydroxybutyric acid (poly3HB). But in order to improve practical properties as a plastic, it is industrially advantageous to copolymerize hydroxyvaleric acid (HV) into a copolymer of poly(3HB-CO-3HV). The HV copolymerization ratio is generally preferably 0-40 mol %. Further, instead of hydroxyvaleric acid, long-chained hydroxyalkanoate such as 3-hydroxyhexanoate, 3-hydroxyoctanoate, 3-hydroxyoctadecanoate, or the like may be copolymerized.

As specific examples of biodegradable aliphatic-family polyester other than a polylactic acid-family resin, at least one kind selected from the group consisting of polybutylene succinate, polybutylene succinate adipate, polybutylene adipate terephthalate, polybutylene succinate adipate terephthalate, polybutylene succinate lactic acid, polybutylene succinate adipate lactic acid, polyester carbonate, a copolymer of polyhydroxybutyrate and polyhydroxyvalerate, and a copolymer of polyhydroxybutyrate and polyhydroxyhexanoate can be cited.

The crystallinity of non-stretched polylactic acid-family resin which is a constituent component of one layer of the biodegradable laminate sheet according to the present invention, is preferably 20% or less, more preferably, 15% or less and further preferably 10% or less.

The method of suppressing the crystallinity of the non-stretched polylactic acid-family resin to 20% or less is not particularly limited. But for example, a method in which a sheet extruded by an extruder is cooled by a cooling roll such as a casting roll (at a temperature of 15-60° C.) to suppress crystallization of the polylactic acid-family resin, and a method in which the rate of D-lactic acid and L-lactic acid in the polylactic acid-family resin is adjusted and because a random copolymer in which the rate of L-lactic acid and D-lactic acid is about 95:5 to 5:95 is low in crystallinity, such polylactic acid-family polymers may be used.

If the crystallinity of the non-stretched polylactic acid-family resin layer exceeds 20%, formability worsens. Thus general purpose forming such as vacuum forming or air-pressure forming becomes difficult. Also, if the crystallinity exceeds 20%, due to the growth of spherulites of the polylactic acid-family resin, the transparency will worsen.

For the crystallinity of the polylactic acid-family resin, its lower limit is not limited if it is 20% or less.

The polylactic acid-family resin layer is preferably a non-stretched one. If a sheet obtained by stretching a polylactic acid-family resin is used, in order to obtain a formed body, excessive pressure of e.g. about 9 kg/cm$^2$ is necessary, so that forming at low pressure such as vacuum forming will be difficult. Also, since a stretched sheet needs an extra step of stretching compared to a non-stretched one, it is disadvantageous in cost too.

The glass transition temperature of the biodegradable resin other than a polylactic acid-family resin which is a constituent component of the other layer of the biodegradable laminate sheet according to the present invention is preferably 0° C. or lower, and more preferably −20° C. or lower. If high than 0° C., the improvement in the shock resistance is insufficient. Also, the lower limit of the glass transition temperature is not particularly limited, but is preferably practically −60° C. or more. With a material of which the glass transition temperature is lower than −60° C., the melting point will be lower than 80° C., so that the heat resistance may be insufficient.

Also, the melting point of the biodegradable resin other than a polylactic acid-family resin has to be 80° C. or over. If the melting point is less than 80° C., the heat resistance of the formed body may be insufficient. Also, the upper limit of the melting point is not particularly limited, but from the viewpoint of formability, it is preferably 170° C.

The layer comprising the biodegradable resin other than a polylactic acid-family resin may be a stretched one or a non-stretched one, but as described above, from the cost aspect, a non-stretched one is preferable.

The thickness of the biodegradable laminate sheet of the present invention is not particularly limited, if it has such a thickness that it can be used for a normal heat forming technique. But normally, the total thickness is preferably in the range of 0.07-2.0 mm.

Also, the ratio of the thickness of the layer comprising the biodegradable resin other than a polylactic acid-family resin to the thickness of all the layers is 0.005-0.7. Specifically, the thickness of the layer comprising the biodegradable resin other than a polylactic acid-family resin is preferably 0.003-0.1 mm, more preferably 0.005-0.05 mm.

The thickness of the layer of a polylactic acid-family resin is a thickness obtained by subtracting the thickness of the layer comprising the biodegradable resin other than a polylactic acid-family resin from the total thickness.

The biodegradable laminate sheet of the present invention will do if it contains at least two layers, i.e. a non-stretched polylactic acid-family resin layer and a layer comprising the biodegradable resin other than a polylactic acid-family resin.

Further, if the biodegradable laminate sheet of the present invention is formed of at least three layers, one layer is outer layers, and the other layer is at least one layer sandwiched by the outer layers. Specifically, the layer comprising the biodegradable resin other than a polylactic acid-family resin forms the outer layers, and the non-stretched polylactic acid-family resin layer is at least one layer sandwiched by the outer layers, or alternatively the non-stretched polylactic acid-family resin is the outer layers, and the layer comprising the biodegradable resin other than a polylactic acid-family resin may be at least one layer sandwiched by both of the outer layers.

Also, so long as the object of the present invention is not impaired, end materials produced during the manufacturing process may be mixed in the other layer for recycling.

The method of manufacturing the biodegradable laminate sheet of the present invention is not particularly limited if the object of the present invention is not impaired. But for example, ① a coextrusion method in which the polylactic acid-family layer and the layer comprising a biodegradable resin other than a polylactic acid-family resin are laminated with a multi-manifold type or field block type base using two or three or more extruders to extrude as a molten sheet, ② a method in which the one layer, which has been rolled out, is coated with the other resin, and ③ a method in which the layers, which are at suitable temperatures, are hot-pressed using a roll or press, and ④ a method in which they are stuck together using an adhesive can be cited. But in view of ease of the manufacturing and the cost, the coextrusion method is preferable.

The forming temperature for the biodegradable laminate sheet is preferably the melting point of the biodegradable resin other than a polylactic acid-family resin or higher. If less than the melting point, the heat resistance and formability may be insufficient.

By forming the biodegradable laminate sheet according to the present invention by an arbitrary method such as by using a forming mold, a formed body is obtainable. As examples of the formed body, there are lunchboxes, trays and cups for foods such as fresh fish, meat, fruits and vegetables, bean curds, household dishes, desserts and instant noodles; packaging containers for toothbrushes, batteries, drugs, cosmetics, etc.; hot-fill containers for puddings, jam and curry; plastic cases having fold lines; or trays for transporting electronic parts such as ICs, transistors and diodes; and carrier tapes.

Further, for the biodegradable laminate sheet of the present invention, various modifications are possible by adding secondary additives. As examples of secondary additives, stabilizers, antioxidants, UV absorbers, pigments, antistats, conductive agents, release agents, plasticizers, perfumes, antimicrobials, nucleation agents, and other similar ones can be cited.

EXAMPLES

Below, by showing manufacturing examples, examples and comparative examples, the present invention will be described in detail, but the present invention is not limited whatsoever. Physical values in Examples and Comparative Examples were measured and evaluated by the following methods.

◆ Heat Resistance

For formed bodies obtained from biodegradable laminate sheets, after carrying out heat treatment for 20 minutes at 80° C. using a hot air circulation type oven (FC-610 made by Advantec Toyo Kaisha, Ltd.), they were let to cool to 23±2° C. The heat-treated formed bodies were put in water of 23±2° C. with the volume of the water filling the formed bodies made as the volume (internal volume) of the formed bodies. On the other hand, water of 23±2° C. was put into formed bodies which were left at 23±2° C. without carrying out heat treatment, and the volume of the water filling the formed body was made as the volume (internal volume) of the formed bodies before heat treatment. Using them, the volume reduction ratio of the formed bodies was calculated from the following formula.

Volume reduction ratio={1−(volume of formed body after heat treatment/volume of formed body before heat treatment)}×100

◆ Shock Resistance

Using Hydroshot shock tester Model HTM-1 made by Toyo Seiki Co., Ltd., at temperature 23° C., a firing core having a diameter of ½ inch was collided against the biodegradable sheets at a speed of 3 m/sec. and the energy needed to destroy it was calculated.

◆ Crystallizing Temperature

Under JIS-K-7121, using differential scanning calorimetry (hereinafter DSC), ΔHm and ΔHc attributable to polylactic acid-family resin in biodegradable sheet were determined at the temperature rising speed of 10° C./min, and the crystallizability of polylactic acid-family resin was calculated by use of the following formula:

Cristallinity:

$xc\% = (\Delta Hm - \Delta Hc)/(92.8 \times \text{content of polylactic acid-family resin in sheet}) \times 100$ ◆ Melting Point Under JIS-K-712, under differential scanning calorimetry (DSC), the melting point was measured at the temperature rising speed of 10° C./min.

◆ Formability

Using a forming mold (mold temperature 25° C.) of 100 mm dia, depth 30 mm, drawing ratio of 0.3, vacuum forming (vacuum pressure: −70 cmHg) was done, and the shape imparting state of the formed bodies was observed.

Haze

Measurements were made under JIS-K-7105.

Example 1

15 ppm of tin octylate was added to 100 kg of L-lactide (trade name: PURASORB L) made by PURAC JAPAN, and the mixture was put in a 500-liter batch type polymerization tank having a stirrer and heater. Nitrogen replacement was carried out, and polymerization was carried out for 60 minutes at 185° C. at the stirring speed of 100 rpm. The molten resin obtained was fed into a 40 mm dia. same-direction, two-shaft extruder having vacuum vents in three tiers and made by Mitsubishi Heavy Industries, Ltd. and extruded in strands at 200° C. while degassing at a vent pressure of 4 torr to pelletize it, and dried at 70° C. for 24 hr. The weight-average molecular weight of the polylactic acid-family resin obtained was 200000, and the L-body content was 99.5%. The melting point measured under DSC was 171° C.

The pellets obtained were fed to a 65 mm dia. single-shaft extruder, and were extruded through a multi-manifold type base at 200° C. for an intermediate layer.

Also, simultaneously, dried pellets of polybutylene succinate adipate (BIONOLLE made by Showa Highpolymer Co., Ltd. melting point: 95° C., glass transition temperature: −40° C.) as a biodegradable resin other than a polylactic acid-family resin were fed into a 32 mm dia. single-shaft extruder, and were extruded through a multi-manifold type base at 190° C. for front and back layers. At this time, the extruding amount was adjusted so that the thickness ratio of the front layer, intermediate layer and back layer would be about 1:28:1.

The extruded molten sheet was brought into contact with a cast roll at 40° C., and a biodegradable laminate sheet 300 microns thick was obtained. The crystallinity of the polylactic acid-family resin of the biodegradable laminate sheet obtained was 9%.

Next, using the biodegradable laminate sheet obtained, a formed body was formed. That is, using a forming mold (mold temperature 25° C.), vacuum forming was carried out at the sheet temperature of 100° C., vacuum pressure of −70 cmHg to obtain a biodegradable formed body. The formed body obtained was evaluated in heat resistance, shock resistance, formability and haze at 80° C. for 20 min. The results thereof are shown in Table 1.

Example 2

Except that the thickness ratio of the front layer, intermediate layer and back layer was changed to 1:8:1, a biodegradable laminate sheet was obtained in the same manner as in Example 1. The crystallinity of the polylactic acid-family resin of the biodegradable laminate sheet obtained was 8%.

Also, using the biodegradable laminate sheet obtained, a formed body was obtained in the same manner as in Example 1. The formed body obtained was evaluated as in Example 1. The results thereof are shown in Table 1.

Example 3

Except that the thickness ratio of the front layer, intermediate layer and back layer was changed to 1:4:1, a biodegradable laminate sheet was obtained in the same manner as in Example 1. The crystallinity of the polylactic acid-family resin of the biodegradable laminate sheet obtained was 8%.

Also, using the biodegradable laminate sheet obtained, a formed body was obtained in the same manner as in Example 1. The formed body obtained was evaluated as in Example 1. The results thereof are shown in Table 1.

Example 4

The biodegradable resin other than a polylactic acid-family resin used in Example 1 was fed to a 65 mm dia. single-shaft extruder, and extruded through a multi-manifold type base at 190° C. for the intermediate layer.

Also, simultaneously, the polylactic acid-family resin used in Example 1 was fed to a 32 mm dia. single-shaft extruder, and extruded through a multi-manifold type base at 200° C. for front and back layers. At this time, the extruding amount was adjusted so that the thickness ratio of the front layer, intermediate layer and back layer would be 2.5:1:2.5.

The extruded molten sheet was brought into contact with a cast roll at 40° C., and a biodegradable laminate sheet 300 microns thick was obtained. The crystallinity of the polylactic acid-family resin of the biodegradable laminate sheet obtained was 7%.

Also, using the biodegradable laminate sheet obtained, a formed body was obtained in the same manner as in Example 1. For the formed body obtained, the same evaluations as in Example 1 were carried out. The results thereof are shown in Table 1.

Example 5

Except that as the biodegradable resin other than a polylactic acid-family resin, polybutylene succinate (BIONOLLE made by Showa Highpolymer Co., Ltd. melting point: 111° C., glass transition temperature: −40° C.) was used, a biodegradable laminate sheet was obtained in the same manner as in Example 1. The crystallinity of the polylactic acid-family resin of the biodegradable laminate sheet obtained was 8%.

Also, the biodegradable laminate sheet obtained was subjected to vacuum forming at the sheet temperature of 120° C., and the vacuum pressure: −70 cmHg to obtain a biodegradable formed body.

For the formed body obtained, the same evaluations as in Example 1 were carried out. The results thereof are shown in Table 1.

Example 6

15 ppm of tin octylate was added to 90 kg of L-lactide (trade name: PURASORB L) made by PULAC JAPAN, and 10 kg of DL-lactide (trade name: PURASORB DL) made by the same company, and the mixture was put in a 500-liter batch type polymerization tank having a stirrer and a heater. Nitrogen replacement was carried out, and polymerization was carried out for 60 minutes at 185° C. at the stirring speed of 100 rpm. The molten article obtained was fed into a 40 mm dia., same-direction, two-shaft extruder having vacuum vents in three tiers and made by Mitsubishi Heavy Industries, Ltd. and extruded in strands at 200° C. while degassing at the vent pressure of 4 torr to pelletize it, and dried at 70° C. for 24 hr.

The weight-average molecular weight of the polylactic acid-family resin obtained was 200000, and the L-body content was 94.8%. The melting point measured by DSC was 165° C.

Except that the pellets obtained were used, a biodegradable laminate sheet was obtained in the same manner as in Example 1. The crystallinity of the polylactic acid-family resin of the biodegradable laminate sheet obtained was 4%.

Also, using the biodegradable laminate sheet obtained, a formed body was obtained in the same manner as in Example 1. For the formed body obtained, the same evaluations as in Example 1 were carried out. The results thereof are shown in Table 1.

Comparative Example 1

The polylactic acid-family resin used in Example 1 was fed to a 65 mm dia. single-shaft extruder, and extruded through a base for a single layer at 200° C. The extruded molten sheet was brought into contact with a cast roll of 40° C. to obtain a polylactic acid-family resin single sheet 300 microns thick. The crystallinity of the polylactic acid-family resin of the biodegradable laminate sheet obtained was 8%.

Also, using the biodegradable laminate sheet obtained, a formed body was obtained in the same manner as in Example 1. For the formed body obtained, the same evaluations as in Example 1 were carried out. The results thereof are shown in Table 1.

Comparative Example 2

The biodegradable laminate sheet obtained in Example 1 was subjected to heat treatment in a hot-air oven at 80° C. for 24 hours. The crystallinity of the polylactic acid-family resin of the biodegradable laminate sheet obtained was 33%.

Also, using the biodegradable laminate sheet obtained in Example 1, a formed body was obtained in the same manner as in Example 1. For the formed body obtained, the same evaluations as in Example 1 were made. The results thereof are shown in Table 1.

capable of various formings such as vacuum forming, air-pressure forming, vacuum air-pressure forming and press forming.

TABLE 1

|  |  | unit | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|---|
| front & back layer | resin | — | B | B | B | A | B | B | A | B | B |
|  | thickness | μ | 10 each | 30 each | 50 each | 125 each | 10 each | 10 each | — | 10 each | 10 each |
| middle layer | resin | — | A | A | A | B | A | A | A | A | A |
|  | thickness | μ | 280 | 240 | 200 | 50 | 280 | 280 | — | 280 | 280 |
| sheet thickness |  | μ | 300 | 300 | 300 | 300 | 300 | 300 | 300 | 300 | 300 |
| front & back layer/whole layer thickness ratio (μ) |  | — | 0.07 | 0.2 | 0.33 | 0.17 | 0.07 | 0.07 | 0 | 0.07 | 0.07 |
| Crystalinity |  | % | 9 | 8 | 8 | 7 | 8 | 4 | 8 | 33 | 9 |
| Forming temp. |  | ° C. | 100 | 100 | 100 | 100 | 120 | 100 | 100 | 100 | 75 |
| Heat resistance | Volume reduction ratio | % | 1.5 | 1 | 0.5 | 1.1 | 0.8 | 1.1 | 85 | 1 | 31.5 |
| Shock resistance |  | kgf · mm | 15 | 25 | 50 | 24 | 14 | 15 | 4 | 17 | 15 |
| Haze |  | % | 9 | 26 | 45 | 20 | 30 | 9 | 3 | Unmeasurable | 9 |
| Formability |  | — | ○ | ○ | ○ | ○ | ○ | ○ | ○ | x | Δ |

A: Polylactic acid-family resin
B: Biodegradable resin other than polylactic acid-family resin
Crystallinity: Crystallinity of polylactic acid-family resin in biodegradable laminate sheet
Forming temperature: Temperature of biodegradable laminate sheet during forming Comparative Example 3

For the biodegradable laminate sheet obtained in Example 1, vacuum forming was carried out at a sheet temperature of 75° C. and vacuum pressure of −70 cmHg to obtain a biodegradable formed body.

For the formed body obtained, the same evaluations as in Example 1 was carried out. The results thereof are shown in Table 1.

RESULTS

As shown in Table 1, Examples 1-6 were satisfactory in heat resistance, shock resistance and formability, and good results were obtained. For ones in which the rate of the layer comprising the biodegradable resin other than a polylactic acid-family resin was low, transparency was good too.

On the other hand, in Comparative Example 1, since there is no layer comprising a biodegradable resin other than a polylactic acid-family resin, the results were poor in heat resistance and shock resistance.

In Comparative Example 2, since the crystallinity of the polylactic acid-family resin was high, the shape imparting properties of the formed body were insufficient and there was no transparency either.

In Comparative Example 3, since it is formed at a lower temperature than the melting point of the biodegradable resin other than a polylactic acid-family resin, the product showed poor heat resistance, and the shape imparting properties were not sufficient either.

EFFECT OF THE INVENTION

As described above, in the present invention, by using a laminate sheet comprising a polylactic acid-family resin and a biodegradable resin other than a polylactic-acid family resin for forming, it is possible to provide a formed body superior in heat resistance, shock resistance, transparency and formability by using a polylactic acid-family which is capable of various formings such as vacuum forming, air-pressure forming, vacuum air-pressure forming and press forming.

The invention claimed is:

1. A method of forming a biodegradable laminate sheet which comprises a non-stretched polylactic acid-family resin layer of which the crystallinity is 20% or less, and a layer comprising a biodegradable resin other than a polylactic acid-family resin having a glass transition temperature of 0° C. or less and a melting point of 80° C. or higher, wherein said method comprises forming said biodegradable laminate sheet at a temperature higher than the melting point of said biodegradable resin other than a polylactic acid-family resin.

2. A method according to claim 1, wherein said biodegradable laminate sheet comprises outer layers comprising said biodegradable resin other than a polylactic acid-family resin, and at least one non-stretched layer comprising said polylactic acid-family resin sandwiched between said outer layers.

3. A method according to claim 2, wherein said non-stretched polylactic acid-family resin layer and said layer comprising a biodegradable resin other than a polylactic acid-family resin are laminated by co-extrusion.

4. A method according to claim 1, wherein said biodegradable laminate sheet comprises non-stretched outer layers comprising said polylactic acid-family resin, and at least one layer comprising said biodegradable resin other than a polylactic acid-family resin sandwiched between said outer layers.

5. A method according to claim 4, wherein said non-stretched polylactic acid-family resin layer and said layer comprising a biodegradable resin other than a polylactic acid-family resin are laminated by co-extrusion.

6. A method according to claim 1, wherein said non-stretched polylactic acid-family resin layer and said layer comprising a biodegradable resin other than a polylactic acid-family resin are laminated by co-extrusion.

* * * * *